Figure 1:
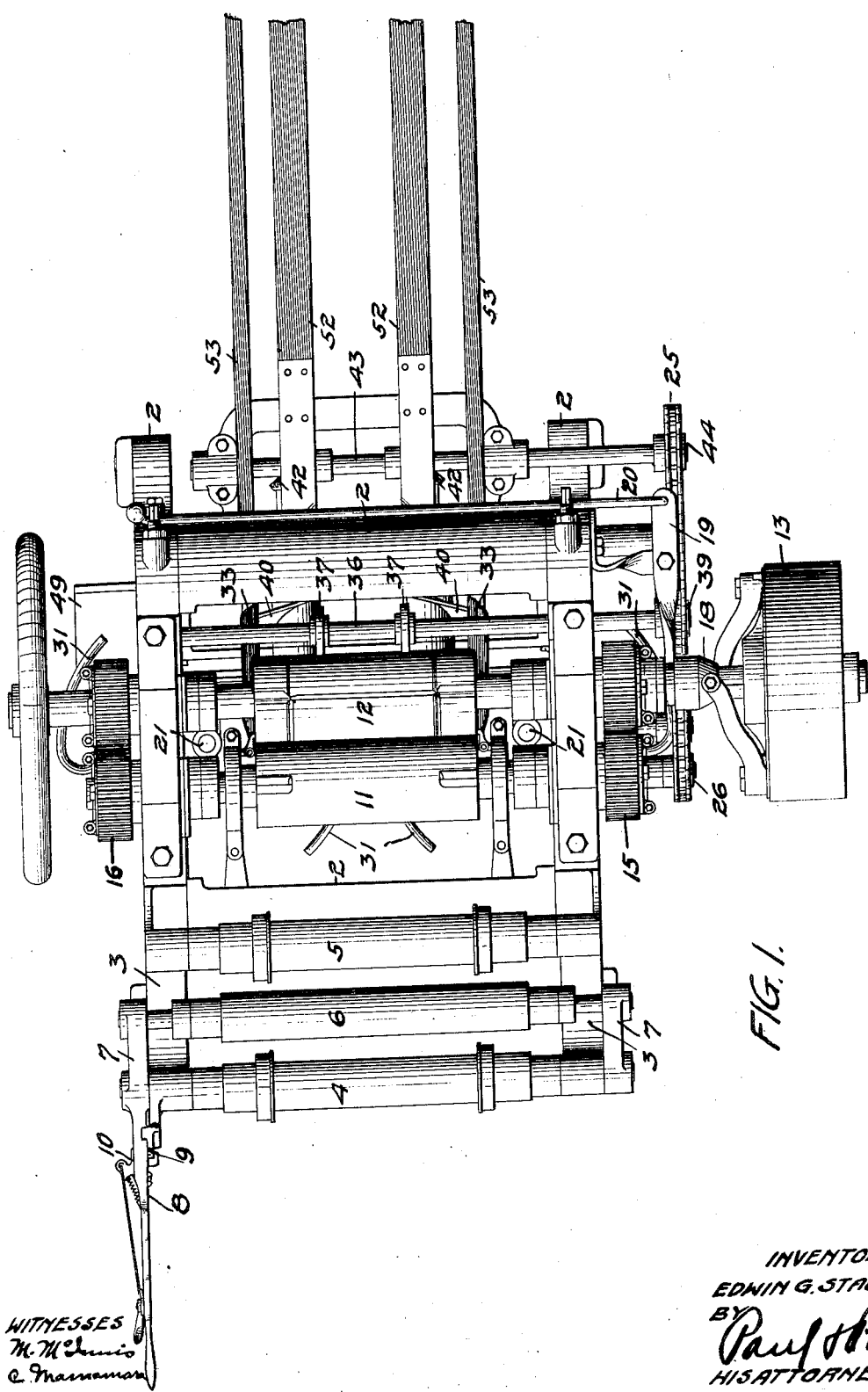

E. G. STAUDE.
MACHINE FOR MAKING FLEXIBLE BOXES.
APPLICATION FILED DEC. 15, 1905.

1,104,012.

Patented July 21, 1914.
5 SHEETS—SHEET 1.

INVENTOR
EDWIN G. STAUDE
BY
Paul & Paul
HIS ATTORNEYS

WITNESSES

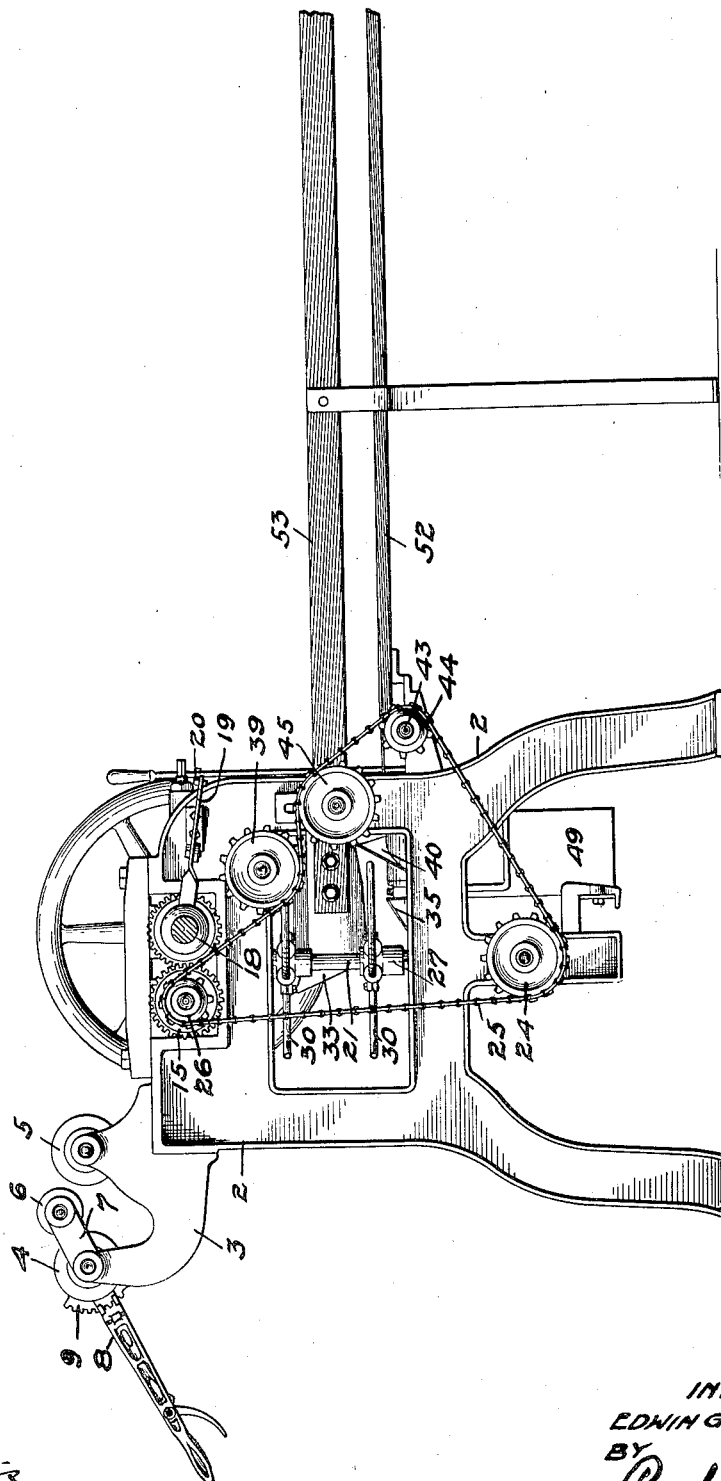

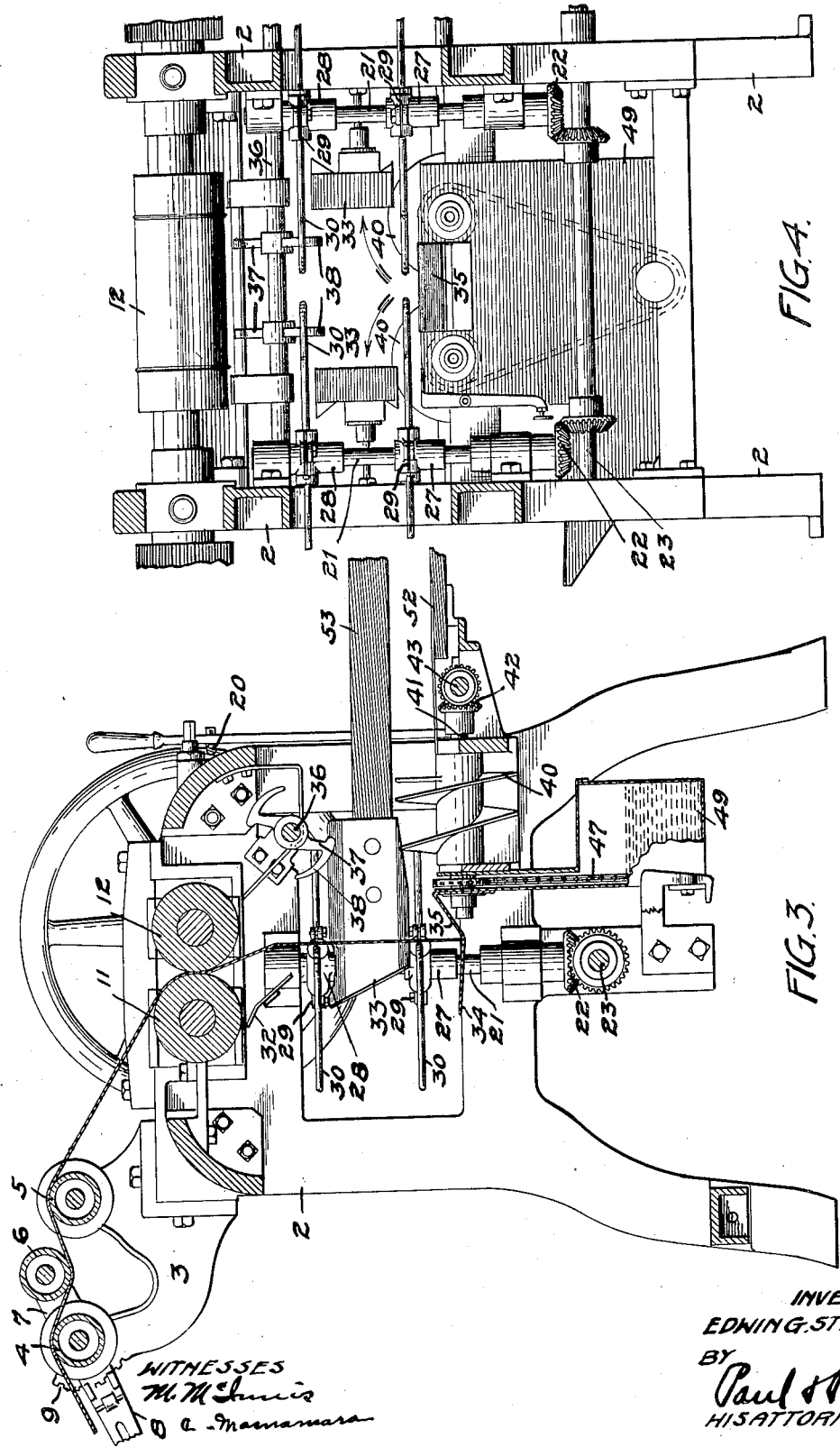

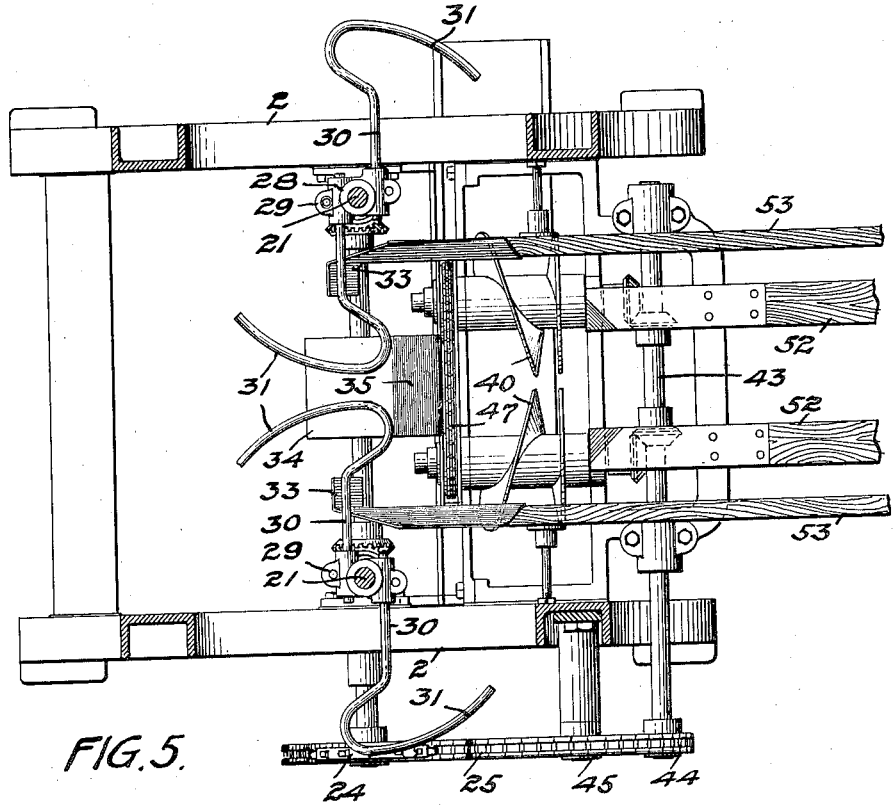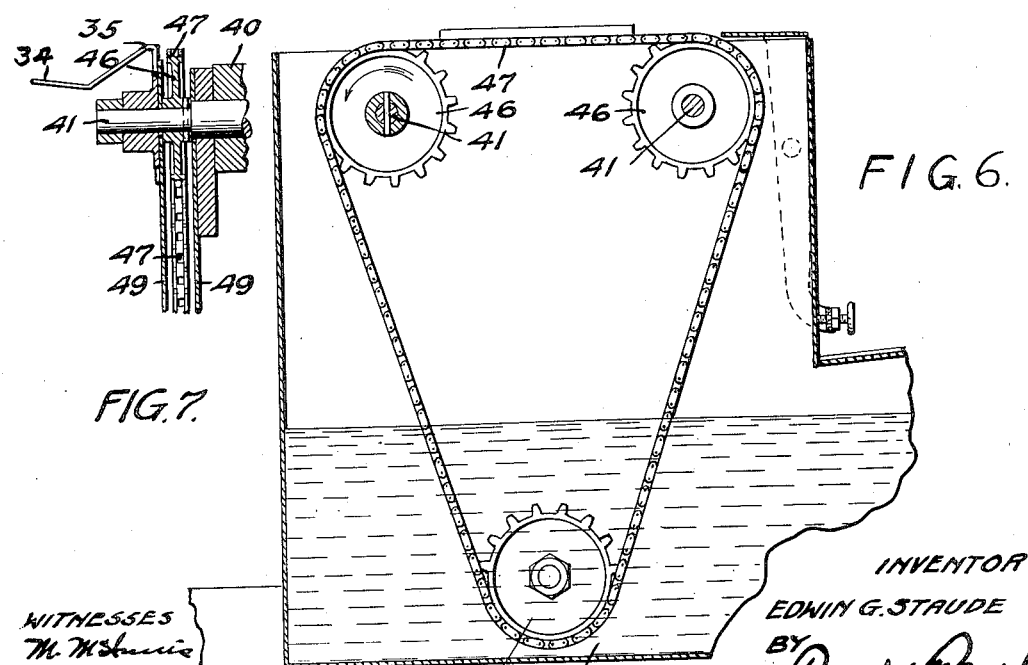

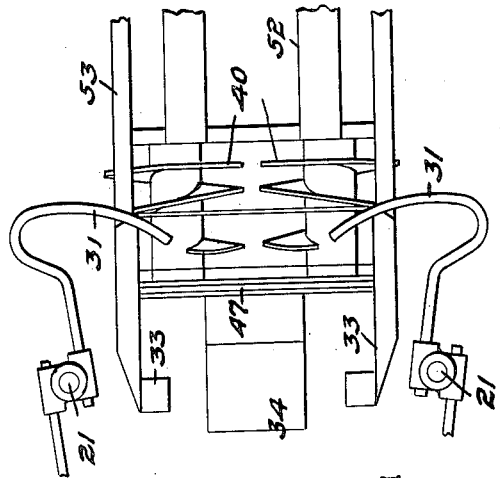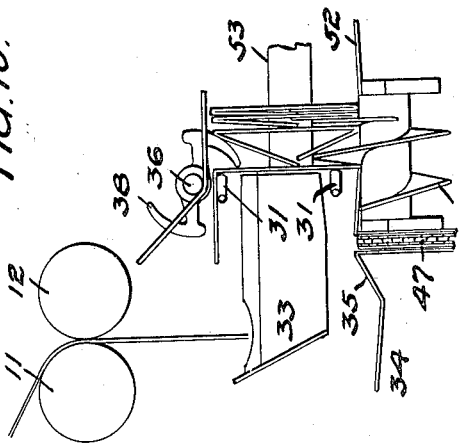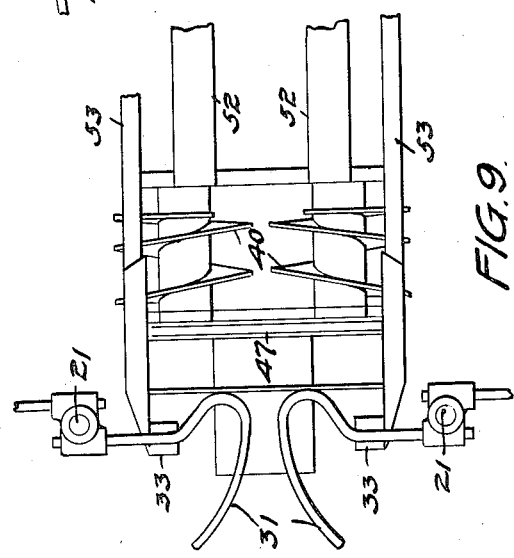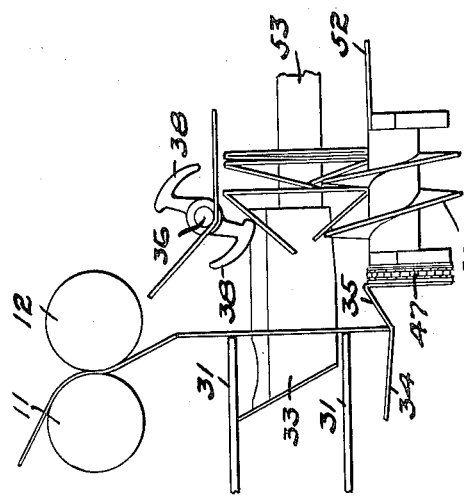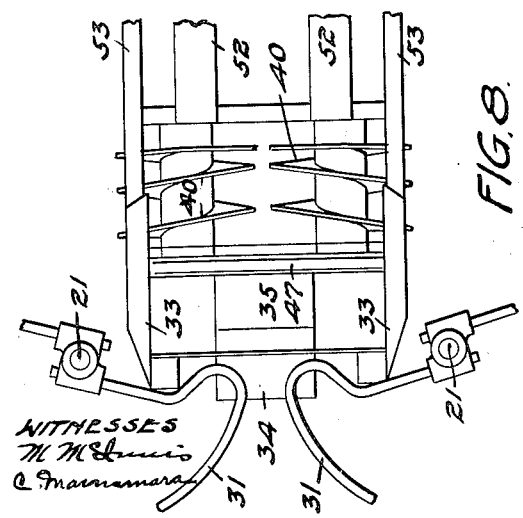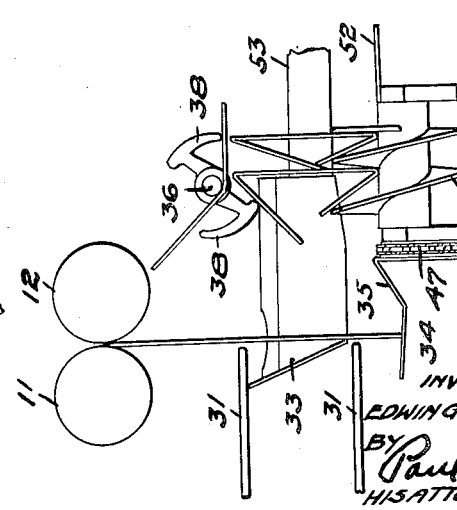

UNITED STATES PATENT OFFICE.

EDWIN G. STAUDE, OF MINNEAPOLIS, MINNESOTA.

MACHINE FOR MAKING FLEXIBLE BOXES.

1,104,012.     Specification of Letters Patent.     Patented July 21, 1914.

Application filed December 15, 1905. Serial No. 291,878.

*To all whom it may concern:*

Be it known that I, EDWIN G. STAUDE, of Minneapolis, Hennepin county, Minnesota, have invented certain new and useful Improvements in Machines for Making Flexible Boxes, of which the following is a specification.

My invention relates to machines for making flexible boxes, and particularly those designed for containing cereal foods.

The object of my invention is to provide a machine for turning out a stiff, strong box, and one in which a comparatively cheap grade of strawboard or other stock can be used.

A further object is to provide a box machine capable of making boxes that will be uniform in size throughout their length, and folded squarely at the corners.

A further object is to provide a machine of simple and cheap construction, but strong and durable, and one that will occupy a comparatively small floor space.

A further object is to provide a machine that will be easy to operate and have a large capacity.

A further object is to provide a machine wherein the box blank is folded and packed while in a vertical position.

The invention consists, generally, in providing a machine wherein the box blank is folded crosswise of the grain, so that it will run around the box instead of up and down, as is generally the case in flexible boxes.

Further, the invention consists in means for folding the blank while supported in a vertical position.

Further, the invention consists in providing a combined folding and packing means.

Further, the invention consists in various constructions and combinations, all as hereinafter described and particularly pointed out in the claims.

In the accompanying drawings forming part of this specification, Figure 1 is a plan view of a box-making machine embodying my invention. Fig. 2 is a side elevation of the same. Fig. 3 is a vertical sectional view illustrating the position assumed by the blank preparatory to the folding operation. Fig. 4 is a vertical sectional view taken on a line substantially at right angles to the section line of Fig. 3. Fig. 5 is a horizontal sectional view illustrating the rotary folders and the spiral packers at the discharge end of the machine. Fig. 6 is a detail sectional view of the paste reservoir. Fig. 7 is a detail sectional view of the paste belt or chain which operates in the reservoir. Figs. 8, 9, 10, 11, 12 and 13 represent the successive steps in the operation of folding the blanks.

In the drawing, 2 represents a suitable frame provided on its receiving end with a horizontal extension or bracket 3. Upon this bracket I provide rolls 4 and 5 mounted in bearings thereon, and between the said rolls I provide a third roll 6 supported by links 7 that have a common pivot with the roll 4, and are oscillated by a lever 8. The roll 6 is adapted to drop between the rolls 4 and 5, and a series of notches 9 provided on said bracket are adapted to receive a locking latch 10 on said lever and allow the roll 6 to be tilted to different angles to vary its position with respect to the rolls 4 and 5. These rolls serve to flatten and straighten out the paper which has a tendency to curl, particularly when near the end of the roll. I usually provide in connection with this machine an apparatus for applying paraffin to the surface of the paper leaving a narrow strip across one end of the blank to which the paste-coated flap at the other end of the blank will adhere. This apparatus, however, will form the subject matter of a divisional application, and I do not therefore illustrate or describe it herein.

The grain of the paper runs lengthwise of the strip as it is unwound from the roll or spool, and the unparaffined surface will extend transversely of the strip of paper and at right angles to its grain.

11 and 12 represent cutting rolls preferably arranged side by side in a horizontal plane, instead of one above the other in a vertical plane, as is usual in machines of this type. The shaft of the roll 12 has a driving pulley 13, and is connected through gears 15 and 16 with the shaft of the roll 11. The driving pulley is provided with a suitable clutch mechanism 18 operated by a lever 19 and a rod 20 extending across the machine. The paper as it passes down between the cutting rolls 11 and 12 is cut across the grain and scored with the grain. The flap to which the paste is subsequently applied is formed on the forward end of the blank, instead of on one of the side edges, as usual. Below the cutting rolls I provide upright shafts 21 connected through gears 22 with a horizontal shaft 23, which is provided with a sprocket wheel 24 and is driven by a chain 25 from a sprocket 26 on the shaft of the cutting rolls 11. Upon the shafts 21 horizontally operating folders are mounted consisting of hubs 27 and 28 having clamps 29 wherein arms 30 are adjustably secured, said arms having loops 31 formed in their outer ends for the purpose of engaging and continuing in contact with the blank during a portion of the revolution of said arms. I prefer to provide a pair of the hubs 27 and 28 on each shaft 21, each hub carrying a pair of revolving folders, those on one hub co-operating with those of the opposite hub on the same level, and contacting with the blank at substantially the same time.

The blanks are fed down in a vertical position from the cutting rolls, being directed into the path of the revolving folders by suitable guide plates 32 and between wings 33 to a point where the lower end of the blank will contact with a substantially horizontal plate 34, which prevents further downward movement of the blank and serves as a rest or support therefor. In this vertical position the blank will be engaged by the revolving folders and moved horizontally and broken along the scoring lines, the lower end sliding up over the inclined portion 35 of the plate 34 and being held back thereby sufficiently to insure folding along the scoring line when engaged by the revolving folders. A shaft 36 is provided near said folders, whereon folders 37 operating in vertical planes are mounted. These folders 37 have arms 38 adapted to engage the upper ends of the blanks and fold them over upon the middle portions. The shaft 36 extends through the side of the machine, and is provided with a sprocket wheel 39 driven from the chain 25. Near the plate 35 I provide spiral packers 40 having shafts 41 driven through gears 42 from a shaft 43 which has a sprocket 44 operated from the chain 25, said chain passing over an idle gear 45 arranged on the frame between the sprockets 39 and 44. Sprockets 46 are mounted on the shafts 41 and carry a chain 47 which extends down around a sprocket 48 near the bottom of the paste reservoir 49, which is mounted on the machine frame beneath the revolving spirals. This reservoir is adapted to contain a supply of paste, which is gathered up by the chain and carried to the top of the reservoir, where the end of the blank as it is moved toward the revolving spirals will contact with the chain and be smeared with paste.

To hold the middle portion of the blank up out of contact with the chain during the last part of the folding operation, I extend the plate 34 to a point above the level of the horizontal run of the chain 47. When the blank is moved horizontally it will slide over this extension without contacting with the chain, until the lower end of the blank is reached, when as it passes from engagement with the extension it will drop down upon the chain and be thoroughly coated with the paste. By the time the blanks enter the revolving spirals their ends will be folded in upon the middle portion of the blank, and passing through the spirals in an upright position will be discharged therefrom upon the bars 52, which with the guide rails 53 constitute a packing or storing frame or receptacle for the completed blanks.

The operation of the machine is as follows: A strip of strawboard or other material is fed into the straightening rolls as described, and then passes to the cutting and scoring rolls, where the paper is severed and scored to form blanks of the desired dimensions. Upon leaving these rolls the blank assumes a vertical position and is engaged by the horizontally revolving folders and moved, still retaining its upright position toward the secondary folders and packers. During the time the blank is moving toward the packers the paste is applied to the tongue or strip at the lower end, and the middle portion of the blank is forced by the ends of the folders until the upper and lower portions thereof are in the path of the folders revolving in vertical planes and the spiral packers. It will be noted that the blank always remains in an upright position after it leaves the cutting rolls, and the folding operation is performed by a very simple and inexpensive mechanism which occupies but little space in the machine. The horizontally revolving folders will remain in contact with the blanks until they are engaged by the spirals and the vertically revolving folders. The continuous movement of the blanks after leaving the cutting rolls is thus insured. By folding the blanks across the grain I am able to construct a box or carton with the grain running horizontally or around it, instead of vertically or lengthwise, and thus produce a much stiffer and stronger article than is usually made from material of this kind.

I claim as my invention:

1. In a machine of the class described, means for feeding a blank in a vertical plane in combination with folders revolving in a plane substantially at right angles to said feeding plane and adapted to engage and move the blank bodily in a horizontal plane with the plane of the blank facing toward its line of travel while standing in a vertical position and the preliminary fold is being made, substantially as described.

2. In a machine of the class described, means for feeding a blank in a substantially vertical plane, and means for moving the blank bodily in a plane substantially at right angles to its first feeding plane with the blank standing in an upright position and its plane facing toward its line of travel, a part of said means engaging the upper and lower ends of the blank to fold the same toward the central portion of the blank while moving the blank in a plane substantially at right angles to its first feeding plane, substantially as described.

3. In a machine of the class described, the combination with means for delivering blanks on end in a vertical plane, of folders comprising radiating arms arranged to operate in a plane substantially at right angles to said feeding plane and engage said blanks to move them horizontally while they stand in an upright position with the plane of the blanks facing toward their line of travel, substantially as described.

4. In a machine of the class described, folders comprising radiating arms operating in substantially horizontal planes and having hooked ends to engage and bear on the middle portion of the blank, for the purpose specified.

5. In a machine of the class described, folders adapted to revolve in a horizontal plane and to engage and move a blank in a horizontal plane, while standing vertical, during the operation of making preliminary folds in the blank, in combination with folders revolving in a vertical plane and adapted to engage and move the blank horizontally during the operation of making the final folds therein, substantially as described.

6. In a machine of the class described, a rotatable horizontally operating folder having a hooked end, in combination with a vertically operating folder arranged to engage the blank before it is released by said horizontally operating folder.

7. In a machine of the class described, a rotatable folder comprising arms having hooked ends arranged to move in a horizontal plane and engage and fold the blank, and a folder operating substantially at right angles to said first named folder and arranged to engage the blank before it is released by said arms.

8. In a machine of the class described, mechanism for delivering blanks on end, in combination with horizontally revolving folders arranged in pairs one above the other in position to engage and move the blanks horizontally transversely to the plane of the blanks, for the purpose specified.

9. In a machine of the class described, mechanism for delivering the blanks on end, in combination with folders revolving in horizontal planes upon each side of the machine and having hooked ends to engage and fold said blanks horizontally across each end, and said hooked ends having an extended contact with the blanks, for the purpose specified.

10. In a machine of the class described, the combination with means for delivering the blanks in an upright position, and revolving mechanism operating in horizontal planes upon each side of the blanks near their vertical edges for moving them horizontally transversely to the plane of the blanks to make a preliminary fold therein.

11. In a machine of the class described, the combination with means for cutting and scoring the blanks and delivering them on end in an upright position, of folders adapted to revolve in a horizontal plane and to engage and move the blanks horizontally while standing in a vertical position and in making preliminary folds therein, and folders adapted to revolve in a vertical plane and engage and move the blanks while making the final folds therein, substantially as described.

12. The combination with means for delivering a blank in an upright position, of mechanism for moving the blank horizontally and making horizontal bends or folds therein near the top and bottom, and mechanism for applying paste to the lower edge of the blank the full width thereof during such horizontal movement.

13. The combination with cutting and scoring rolls arranged one in front of the other upon substantially the same level and adapted to deliver the blanks beneath them in a vertical position, suitable supports for the blank, and revolving folding devices operating on each side of said support, and arranged to engage and move the vertical blank horizontally and make horizontal bends or folds therein, substantially as described.

14. In a machine of the class described, the combination with means for delivering the blank in an upright position, of horizontally operating means arranged to engage the middle portion of the blanks and bend their ends, revolving means operating in a vertical plane for engaging the ends of the blanks and folding them inwardly, and said horizontally operating means remaining in engagement with the middle portion of the blank during the operation of said end folding means.

15. In a machine of the class described, the combination with revolving folders operating on the blanks in planes transverse to the plane of the blanks, of means for delivering the blanks on end to said operating folders, and combined folders and packers operating substantially at right angles to said first mentioned operating folders.

16. In a machine of the class described, the combination with means for delivering the blanks in an upright position, of means adapted to engage and move the blank bodily in a horizontal plane transverse to the plane of the blanks in the operation of bending their ends, and means for folding in said ends upon the middle portion of the blank, substantially as described.

17. In a machine of the class described, the combination with means for delivering the blank in an upright position, of means for folding it, a paste belt, and means for pressing the lower end of the blank down upon said belt while the blank is in an upright position, substantially as described.

18. In a machine of the class described, the combination with means for delivering the cut and scored blanks in an upright position, of means for moving the blank horizontally to bend its ends, a paste belt, and means arranged to engage the blank and hold its middle portion out of contact with said belt.

19. In a machine of the class described, mechanism for feeding the blank in an upright position, mechanism arranged in relation to the lower end of the blank for applying paste to the lower end of the blank while the blank is in an upright position, means for moving the blank to the pasting mechanism and means for moving the blank horizontally on edge and folding the same.

20. In a machine of the class described, the combination of means for moving a blank in one plane, means for moving said blank in a plane substantially at right angles to the first plane of movement and in an upright position, means for bending the opposite laps of the blank laterally with respect to the intermediate portion of the blank, means for moving the laterally bent laps against the intermediate portion of the blank, and means for moving the folded blanks on edge in a vertical position onto a receiving member.

21. In a machine of the class described, the combination of means for moving a blank in one plane, means for moving said blank in a plane substantially at right angles to the first plane of movement and in an upright position, means for bending opposite laps of the blank laterally with respect to the intermediate portion of the blank, means for applying an adhesive material along one edge of the blank, means for moving the laterally bent laps against the intermediate portion of the blank, and means for moving the folded blanks on edge in a vertical position onto a receiving member.

22. In a machine of the class described, the combination of feeding mechanism for carrying a blank into an upright folding position, means for bending opposite laps of the blank laterally with respect to the intermediate portion of the blank, and means for moving the blank horizontally on edge and folding the laterally bent laps onto the intermediate portion of the blank.

23. In a machine for making flexible boxes, the combination with means for delivering a blank in a substantially vertical position, of mechanism for moving the blank horizontally and making horizontal bends or folds in the ends thereof, and a paste device arranged to apply paste to the lower end of the blank transversely thereof during such horizontal movement.

24. In a machine for making flexible boxes, mechanism for delivering the blanks in a vertical position prior to their being folded, folding devices arranged to engage the middle portion of the blank and move the same horizontally, means engaging the ends of the blank to cause the same to be bent to a horizontal position when the middle portion of the blank is moved by the operation of the folders, and a paste device arranged to apply paste across one end of the blank during such horizontal movement.

25. The combination with mechanism for delivering a blank in a substantially vertical position, of mechanism for moving the blank horizontally to make a preliminary fold therein, a paste device arranged to supply paste to the lower end of the blank during such horizontal movement, and means for guiding the middle portion of the blank out of contact with said device.

26. In a machine for making flexible boxes, the combination with means for delivering a blank in a substantially vertical position, of mechanism for making a preliminary fold in the blank, mechanism operating in vertical planes for engaging the ends of the blank and completing the folding operation, and a paste device arranged intermediate to said folding mechanisms and adapted to apply paste to one end of the blank transversely thereof.

27. In a machine of the class described, the combination with the horizontally operating folders, of the combined folders and packers arranged to fold the ends of a blank after its discharge from the horizontal folders.

28. In a machine of the class described, means for cutting and scoring a blank and delivering it in a vertical position in combination with rotary folders for moving the blank transversely to its plane and making horizontal bends or folds in the upper and lower ends thereof while in such vertical position, means for applying paste to one of said ends, and means for pressing said folding ends in upon the middle portion of the blank, substantially as described.

29. In a machine of the class described, the combination with means for supporting a blank in an upright position, of folders operating in horizontal planes, folders operating in vertical planes, and spirals arranged beneath said last named folders and whereto the folded blanks are delivered, substantially as described.

30. In a machine of the class described, the combination with means for folding a blank, of means for applying paste transversely to one end of the blank, and spirals provided near said pasting means and whereto the blanks are delivered by said folding means, substantially as described.

31. In a machine of the class described, the combination with revolving folders operating in horizontal planes, of horizontally arranged spirals whereto the blanks are delivered from said folders, and a paste device interposed between said folders and said spirals.

In witness whereof, I have hereunto set my hand this 12th day of December, 1905.

EDWIN G. STAUDE.

Witnesses:
 RICHARD PAUL,
 C. MACNAMARA.